(12) United States Patent
Rabellino

(10) Patent No.: US 10,691,406 B2
(45) Date of Patent: Jun. 23, 2020

(54) AUDIO AND VISUAL REPRESENTATION OF FOCUS MOVEMENTS

(71) Applicant: MICROSOFT TECHNOLOGY LICENSING, LLC., Redmond, WA (US)

(72) Inventor: Gianugo Rabellino, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 476 days.

(21) Appl. No.: 15/435,276

(22) Filed: Feb. 16, 2017

(65) Prior Publication Data

US 2018/0232200 A1 Aug. 16, 2018

(51) Int. Cl.
| | |
|---|---|
| G06F 3/16 | (2006.01) |
| G06F 3/0481 | (2013.01) |
| G06F 3/0484 | (2013.01) |
| G06F 3/0482 | (2013.01) |

(52) U.S. Cl.
CPC ............ *G06F 3/167* (2013.01); *G06F 3/0481* (2013.01); *G06F 3/0482* (2013.01); *G06F 3/04812* (2013.01); *G06F 3/04817* (2013.01); *G06F 3/04842* (2013.01)

(58) Field of Classification Search
CPC ................................ G06F 3/167; G06F 3/0481
See application file for complete search history.

(56) References Cited

U.S. PATENT DOCUMENTS

| | | | |
|---|---|---|---|
| 5,374,924 A | 12/1994 | McKiel, Jr. | |
| 5,461,399 A | 10/1995 | Cragun | |
| 5,533,182 A | 7/1996 | Bates et al. | |
| 5,973,689 A | 10/1999 | Gallery | |
| 6,046,722 A | 4/2000 | McKiel, Jr. | |
| 6,448,987 B1* | 9/2002 | Easty | G06F 3/0482 |
| | | | 715/834 |
| 7,844,462 B2 | 11/2010 | Mayer-Ullmann | |
| 8,037,414 B2 | 10/2011 | Michaelis et al. | |
| 8,805,561 B2 | 8/2014 | Wilcock et al. | |
| 8,868,426 B2 | 10/2014 | Voorhees et al. | |
| 9,430,954 B1 | 8/2016 | Dewhurst | |

(Continued)

FOREIGN PATENT DOCUMENTS

AU 2016101424 A4 9/2016

OTHER PUBLICATIONS

"International Search Report and Written Opinion Issued in PCT Application No. PCT/US18/017519", dated Apr. 20, 2018, 13 Pages.

(Continued)

*Primary Examiner* — Shourjo Dasgupta

(57) ABSTRACT

An audio and visual representation of the transition between focus components in a GUI is provided in order to assist a user in understanding the design and layout of the GUI. A focus component is associated with a spatial position in a GUI or window and audio characteristics are generated to represent the focus component that is based on the spatial position. The transition between focus components can be represented visually in the GUI as a path of time-ordered user-selections. The transition between the focus components may also be represented by a continuous audible tone that changes in frequency and pitch between the focus components.

17 Claims, 6 Drawing Sheets

(56) References Cited

U.S. PATENT DOCUMENTS

| | | |
|---|---|---|
| 10,193,989 B2* | 1/2019 | Koerner .................. H04L 67/22 |
| 2002/0054176 A1 | 5/2002 | Ulrich et al. |
| 2008/0168397 A1* | 7/2008 | Nelson .................. G06F 3/0482 |
| | | 715/854 |
| 2009/0013254 A1 | 1/2009 | Walker et al. |
| 2010/0077345 A1* | 3/2010 | Swingler ............... G06F 3/0481 |
| | | 715/802 |
| 2010/0199215 A1 | 8/2010 | Seymour et al. |
| 2012/0221971 A1* | 8/2012 | Trotta ................... G06F 3/0482 |
| | | 715/803 |
| 2012/0221974 A1* | 8/2012 | Trotta ................... G06F 3/0485 |
| | | 715/823 |
| 2017/0147681 A1* | 5/2017 | Tankersley ............ G06F 11/321 |

OTHER PUBLICATIONS

Murphy, et al., "Audio For A Multimodal Assistive Interface", In Proceedings of ICAD 05-Eleventh Meeting of the International Conference on Auditory Display, Jul. 6, 2005. pp. 376-379.

McKiel Jr., Frank, "Audio-Enabled Graphical User Interface For The Blind Or Visually Impaired", In Johns Hopkins APL Technical Digest, vol. 13, No. 4, Feb. 1992, pp. 474-477.

"Windows Accessibility Options for People who Are Blind or Have Low Vision", https://web.archive.org/web/20150422224938/http://www.afb.org/info/living-with-vision-loss/using-technology/using-a-computer/part-ii-for-the-experienced-computer-user-with-a-new-visual-impairment/windows-accessibility-options/12345, Published on: Apr. 22, 2015, 10 pages.

\* cited by examiner

AUDIO AND VISUAL REPRESENTATION OF FOCUS MOVEMENTS

BACKGROUND

Field

The present embodiments relate to techniques for providing accessibility to visually displayed information in displays of electronic devices and more particularly, the visual and audio representation of the focus movement of components of a graphical user interface (GUI).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An audio and visual representation of the transition or movement between focus components in a GUI is provided to assist a user in understanding the design or layout of the GUI. A focus component is a component of a GUI that is selected by a user at runtime. A focus component is associated with a position in a GUI or window. A focus component can also be associated with audio characteristics or parameters that are used to generate a tone that when played represents the position of the focus component in a GUI or window.

The movement between two focus components can be represented visually and audibly. A focus movement can be represented visually as a time-ordered path of the user selections within a GUI. The focus movements can be represented audibly by playing a continuous audible tone that represents the movement between two focus components. The continuous audible tone provides a user with an audible indication of the distance and direction between two focus components. The audio and visual representation of the focus movement of components in a GUI is beneficial for a user in understating the visual composition and behavior of the GUI.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
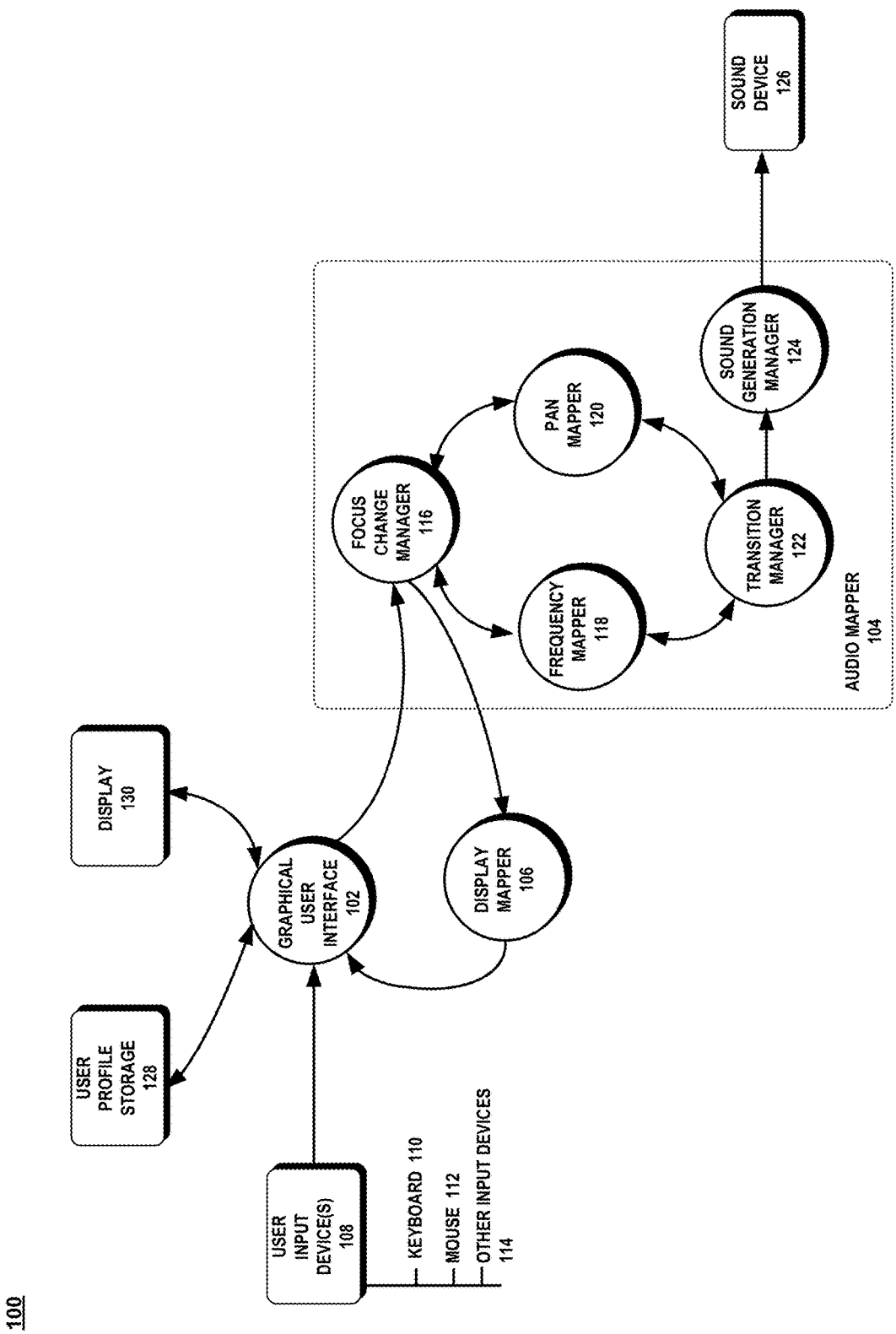
FIG. 1 is a block diagram illustrating exemplary components of a system for the visual and audio representation of focus movements.

A graphical user interface is a software program that is commonly used for a user to interact with an electronic device. The graphical user interface uses components, such as icons, buttons, menus, text boxes, tool bars, etc. to accept user input. When a user selects a component at runtime, the component is deemed to have focus. Focus is the ability to receive user input through an input device, such as a keyboard, mouse, trackball, touch screen and the like. A user gives a component focus by selecting the component at run time when the user selects the component or when program code (i.e., script, method, etc.) activates the component.

The graphical user interface can illustrate a focus component differently than other components that have not been activated. The focus component can be highlighted, animated, displayed with a highlighted border, colored differently, and shown in any manner that differentiates the focus component from non-focus components. A user's interaction with the graphical user interface can be facilitated by not only the visual representation of the current focus component but also the transition between different focus components. A visual representation of the transition between focus components is beneficial to developers of the graphical user interface who use the visual transition as feedback to improve the design the graphical user interface in a more user-friendly manner. Additionally, the visual representation of the transition assists the user with understanding the visual composition and behavior of the graphical user interface.

A graphical user interface imposes significant challenges to blind or visually impaired users who are unable to discern whether a component has focus from the visual indicators shown in the graphical user interface. A blind person typically interacts with a GUI using an input device (e.g., keyboard, touch screen, mouse, etc.) to move a cursor or pointer around the display. People who are blind often rely on sound to help them sense the graphical user interface. Some graphical user interfaces generate sounds as a cursor is positioned onto a component of the graphical user interface. These sounds may consist of musical tones, filtered noise, pre-recorded sound effects, and synthesized speech. The sounds enable the blind user to mentally visualize the graphical user interface to find and manipulate the components of the graphical user interface in a similar manner as a sighted user.

A tone can be associated with a position of a component in a GUI. A GUI and/or display is configured into frequency and amplitude bands that are associated with specific X and Y coordinates of the GUI. The GUI may be configured so that the higher frequency bands are associated with the top of the GUI and lower frequency bands are associated with the bottom of the GUI.

As a blind user traverses the GUI activating the focus from one component to another component, the movement or transition from successive focus components can be represented audibly by a continuous audible tone. In one aspect, the continuous audible tone between two focus components can be composed of a first tone that represents a first focus component and a second tone that represents a second focus component. The length of the first and second tones can be varied as desired.

In a second aspect, the continuous audible tone between two focus components can be composed of a first tone that represents a first focus component, a second tone that represents a second focus component, and a set of intermediate tones that represents the transition between the first and second focus components. The set of intermediate tones includes the number of tones between the first and second tone that can be played within a fixed time interval. In a third aspect, the set of intermediate tones includes each semi-tone in between the first and second tone and the length of the continuous audible tone is varied based on the number of semi-tones between the first and second tones.

The continuous audible tone is useful for the blind user to recognize how far apart the components are from each other from the duration of the continuous audible tone and the direction of the transition from the difference in the pitch (i.e., frequency) and pan (i.e., amplitude) of the continuous audible tone. The continuous audible tone is also useful for the blind user to recognize the path taken in the event the user wishes to return to a particular focus component at a later time.

Audio and Visual Representation of Focus Movements

Attention now turns to FIG. 1 for a description of an exemplary configuration of a system 100 for the audio and visual representation of focus movements. In one aspect of the subject matter disclosed herein, the system 100 includes a graphical user interface (GUI) 102, an audible mapper 104, a display mapper 106, user input devices 108, a sound device 126, a user profile storage 128, and a display 130. The GUI 102 may execute as part of an application (e.g., web browser, operating system, software program, spreadsheet, word processing application, etc.) or as a stand-alone program that receives user input from various user input devices. The audible mapper 104 tracks changes in the focus of the components in the GUI 102 in order to generate tones that represent the transition between focus components. The display mapper 106 tracks the changes in the focus in the GUI 102 in order to visually display the path of the focus movements.

The GUI 102, the audible mapper 104 and the display mapper 106 may be a sequence of computer program instructions, that when executed by a processor (e.g., CPU, controller, etc.) causes the processor to perform methods and/or operations in accordance with a prescribed task. The GUI 102, the audible mapper 104 and the display mapper 106 may be implemented as program code, programs, procedures, module, code segments, components, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The GUI 102 presents a user interface on the display 130. The display 130 is an electronic visual display that is communicatively coupled to an electronic device capable of executing programmable instructions such as, without limitation, a mobile device, a personal digital assistant, a mobile computing device, a smart phone, a cellular telephone, a handheld computer, a server, a server array or server farm, a web server, a network server, an Internet server, a work station, a mini-computer, a mainframe computer, a super-computer, a network appliance, a web appliance, a distributed computing system, multiprocessor systems, or combination thereof.

The GUI 102 includes various components, such as without limitation, components for input control, navigational components, informational components, and containers. The input control components may include, without limitation, checkboxes, radio buttons, dropdown list, list boxes, buttons, dropdown buttons, toggles, text fields, data and time pickers. The navigational components may include, without limitation, any one of the following: search boxes that allow a user to enter a keyword or phrase associated with a search; breadcrumb controls that display a clickable trail of pages navigated by the user; pagination controls that divides the displayed content into pages; tag controls that allow a user to find content in the same category; sliders or track bars that allow a user to set or adjust a value; icons; and/or an image carousel.

The informational components are used to display information and include notification components, progress bars, tool tip components, message boxes, and/or pop-up windows. Containers such as an accordion, which is a vertically stacked list of items that show functions, may also be part of the GUI 102. The user interacts with the GUI 102 through one or more user input devices 108 that can include, without limitation, a keyboard 110, mouse 112, or other input devices 114.

The audio mapper 104 tracks the movements of the focus during a user's interaction with the GUI 102. As the focus changes from one component of the GUI 102 to another component of the GUI 102, the audio mapper 104 generates a continuous audible tone from a component having the previous focus to the component having the current focus. The audio mapper 104 includes a focus change manager 116, a frequency mapper 118, a pan mapper 120, a transition manager 122 and a sound generation manager 124.

The focus change mapper 116 determines the spatial coordinates that represent the position of a component being selected for focus. These spatial coordinates are converted into corresponding frequency and amplitude parameters by the frequency mapper 118 and the pan mapper 120 respectively. The frequency and amplitude parameters are transmitted to the transition manager 122 which generates a set of tones representing the transition or focus movement from the previous focus component and current focus component. The set of tones may include tone a, tone b and/or intermediate tones. Tone a represents the audible position of the previous focus component, tone b represents the audible position of the current focus component. In some embodiments, there are intermediate tones that represent the transition between tone a and tone b.

The set of tones is then transmitted to the sound generation manager 124 that drives a sound device 126 (e.g., sound card, audio processor, audio adapter, sound adapter, etc.) to produce the sounds. The sound generation manager 124 produces a continuous analog waveform that varies in amplitude and frequency and which is output through the sound device 126. The sound device 126 includes multiple channels or speakers that drive the analog waveforms into the air resulting in the sound of the continuous audible tone.

The display mapper 106 receives the positions of the current focus component from the focus change mapper 116 and provides the GUI 102 with the position data to draw a path from the previous focus component to the current focus component. A user may configure the audio mapper 104 and the display mapper 106 to operate in a preferred manner. The user may specify user-defined settings that the GUI 102 stores in a user profile storage 128.

Although the system 100 as shown in FIG. 1 has a limited number of elements in a certain configuration, it may be appreciated that the system 100 may include more or less elements in alternate configurations as desired for a given implementation. Attention now turns to a discussion of the manner in which the focus movements are represented by a continuous audible tone.

Figure 2:
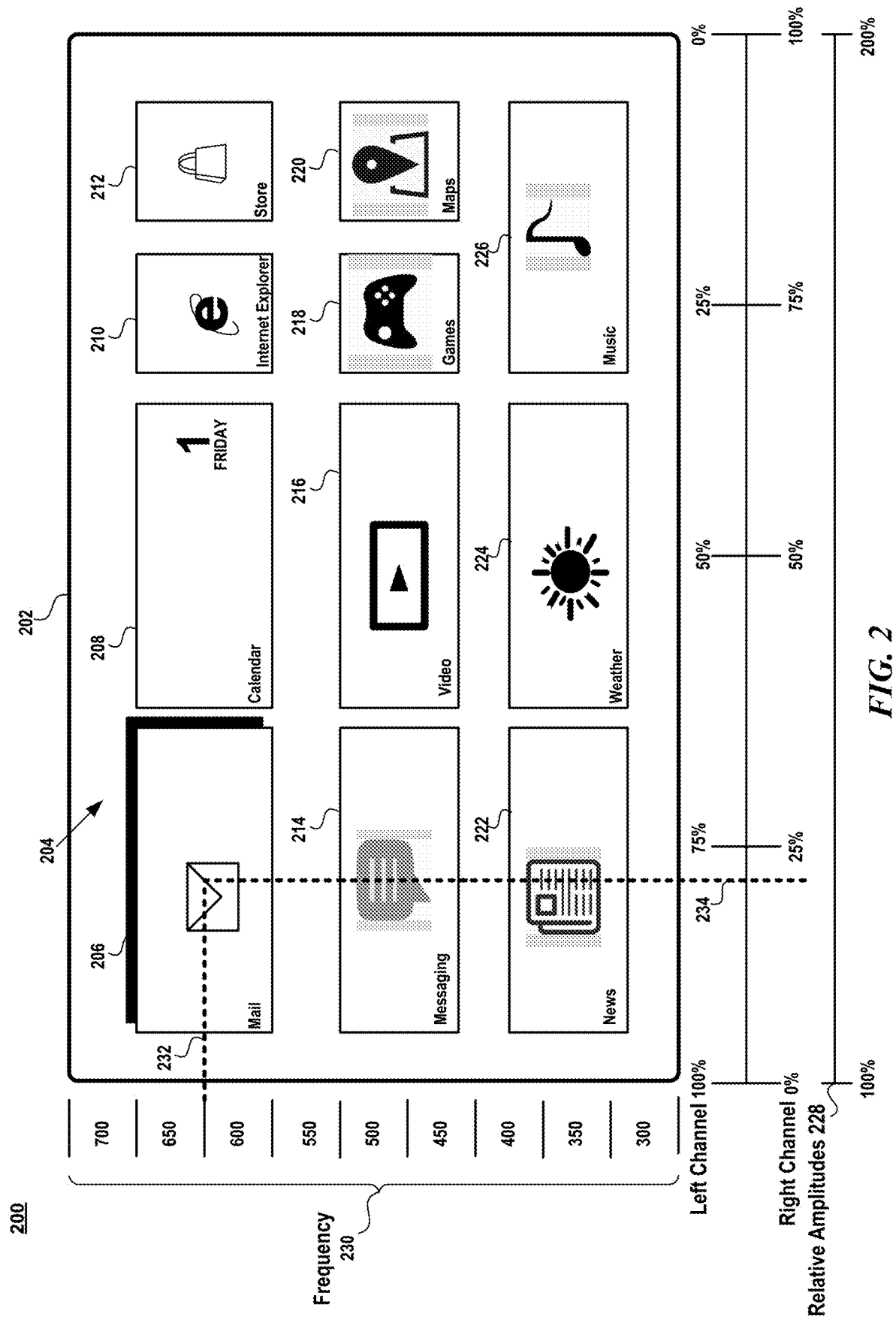
FIG. 2 is a diagram illustrating an exemplary aspect of a display presenting a graphical user interface associated with a coordinate plane that maps the position of a focus component to corresponding X and Y coordinates.

FIG. 2 illustrates an exemplary configuration of a display where the position of a focus component is mapped to a tone. A tone is produced from a pair of laterally spaced apart transducers, such as a left and right speaker. In one or more aspects, the speakers are positioned on opposite sides of a display device or headphones worn by the user. The speakers produce a continuous analog or sound waveform that varies in amplitude and frequency. An audio or sound waveform is determined by an amplitude, frequency or pitch of the sound, and phase or shape of the sound wave (e.g., square sine wave, etc.).

Referring to FIG. 2, the display 200 includes a display area 202 that presents the GUI. The GUI includes various components 206-226. In one aspect of the subject matter disclosed herein, the display area 202 is configured into a coordinate plane having an X-axis (horizontal axis) and a Y-axis (vertical axis). The position of a focus component is determined by its corresponding X and Y coordinates. The X-axis represents the relative amplitudes of the left and right channels which are a function of the horizontal position or X-coordinate of the focus on display 200. The Y-axis represents the pitch or frequency associated with the vertical or Y-coordinate position of the focus on the display 200.

The scale 228 shows graphically the relative left and right amplitudes of the X-axis or the horizontal position of the focus. As the location of the focus moves toward the left, the left channel amplitude increases while the right channel amplitude decreases. As the location of the focus moves toward the right, the right channel amplitude increases while the left channel amplitude decreases. The increase or decrease in the right and left channels indicates audibly to the blind user the direction in which the focus movement occurs. It should be noted that the technology described herein is not limited to the configuration of the amplitudes shown in FIG. 2 and that other configurations are possible to achieve an intended objective.

The scale 230 shows graphically an exemplary arrangement of the frequencies as a function of the Y-axis or vertical position of the focus. In one aspect, the frequencies are configured with the highest pitch at the top of the display or window and the lowest frequency or pitch at the bottom of the display or window. As the user transitions in a direction from the top of the display or window to the bottom of the display or window (i.e., focus position moves vertically), the pitch or frequency of the tone varies in a stepwise fashion.

FIG. 2 represents an exemplary embodiment where there are nine distinct frequencies provided in 50 hertz frequency bands. The transition from one frequency band to another allows the user to know how close the focus is to the top or bottom of the display 202 and the direction of the transition (e.g., up or down). The frequency or pitch variation enables the user to visualize the top or bottom position of the location of the focus.

When a component of the GUI is activated for focus, a position of the component is determined using the X and Y coordinates of the display that correspond to the focus component. As shown in FIG. 2, component 206 is activated or focused. The component 206 has a center position that aligns with a Y-coordinate 232 that corresponds to a frequency of 2100 Hz and an X-coordinate 234 having amplitudes of a left channel at 80% and a right channel at 20%.

A user may configure the tone mapping by providing preferences for the direction of frequency, the shape of the sound waveform, continuous or discrete changes in frequency and amplitude, and the frequency and amplitude ranges. The user-defined settings for the display mapper 106 may include the amount of time that the change in the focus movements is displayed in the GUI 102. These user-defined settings may indicate one or more of the following: a length of time the focus movements are displayed and may include a starting time and an ending time; a user session and/or time with a selected user session; and so forth. If the user does not specify user-defined setting for the display mapper 106 and the audio mapper 104, the system 100 utilizes default settings.

It should be noted that although FIG. 2 describes one particular aspect for mapping spatial positions of a display into tones, the subject matter described herein is not limited to this particular aspect.

Attention now turns to a discussion of the continuous audible tones. In one or more embodiments, a tone is a sound characterized by a frequency or pitch, and amplitude associated with a position of a GUI. The tone associated with a position in the GUI corresponds to a note mapped to a specific music scale, such as a diatonic major (Ionian) or to a chromatic music scale.

A music scale is a sequence of notes ordered by an increasing or decreasing frequency or pitch. A music scale is based on the intervals between the notes, such as a half step interval and a whole step interval. In half step, the notes are adjacent to one another with no note or pitch in between. For example, C is adjacent to C# and there is no noted in between them. In whole step, notes are two half steps apart. For example, C is a whole step apart from D.

Figure 3A:
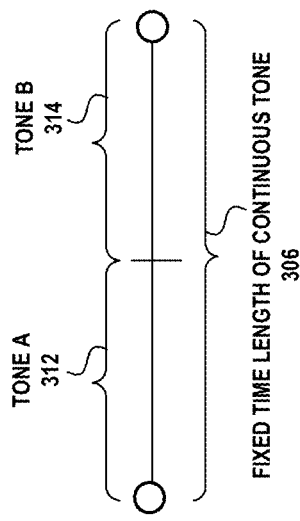
FIG. 3A illustrates an exemplary aspect of a tone with respect to a music scale.

There are several different music scales with each based on a particular configuration of whole steps and half steps. Referring to FIG. 3A, there is shown a C major scale 302. The C major scale 302 is one of the diatonic scales. A diatonic scale is an eight note scale found in Western music which is composed of five whole steps and two half steps. As shown in FIG. 3A, the diatonic C major scale 302 is composed of the notes C, D, E, F, A, B, C where the intervals between C-D, D-E, F-A, A-B are whole steps and the intervals between E-F, B-C are half steps. Each note is associated with a frequency, shown in line 304. For example, C is associated with a frequency of 264 Hertz, D is associated with a frequency of 297 Hertz, E is associated with a frequency of 330 Hertz, F is associated with a frequency of 352 Hertz, G is associated with a frequency of 396 Hertz, A is associated with a frequency of 440 Hertz, B is associated with a frequency of 495 Hertz, and the last note C is associated with a frequency of 528 Hertz.

Another C major scale is a chromatic scale that is a twelve note scale composed of twelve half steps. As shown in FIG. 3A, the chromatic scale is composed of the notes C, C#, D, D#, E, F, F#, G, G#, A, A#, and B where the intervals between C-C#, C#-D, D-D#, D#-E, E-F, F-F#, F#-G, G-G#, G#-A, A-A#, A#-B, B-C are half steps.

It should be noted that the aspects of the subject matter described herein is not limited to any particular music scale and that the tones can be configured to map to any music scale, such as without limitation, the major diatonic (Ionian), minor diatonic (Aeolian), harmonic minor, melodic minor, chromatic, pentatonic, ocatatonic, dorian, Phrygian, Lydian, mixolydian, and locrian.

Figure 3C:
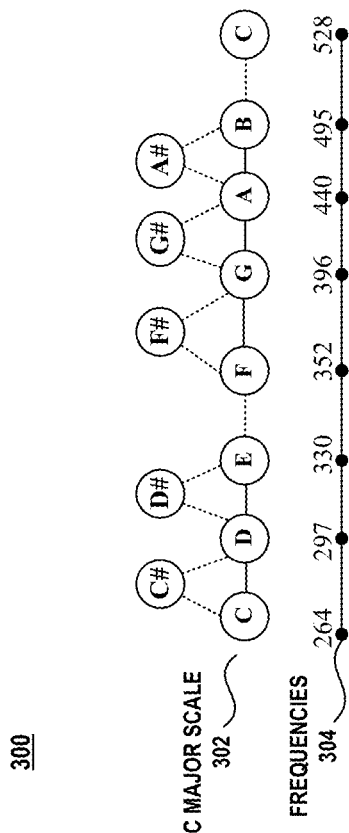
FIGS. 3B-3D are diagrams illustrating exemplary aspects of the continuous audible tones.
Figure 3B:
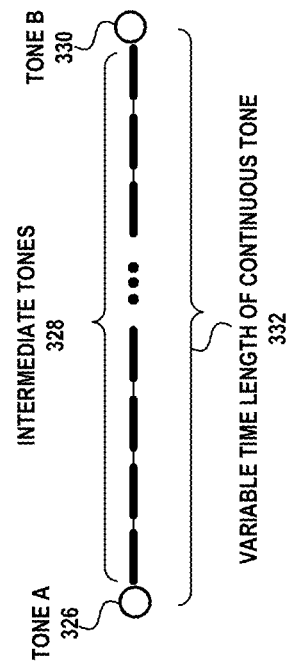

FIG. 3B illustrates one aspect of the configuration of a continuous audible tone. In this aspect, the continuous audible tone is configured to play during a fixed amount of time t (i.e., fixed time interval) 306 and is composed of tone a 312 and tone b 314. Tone a 312 represents a position of a first focus component and tone b 314 represents a position of a second focus component. The first focus component may be the previous focus component and the second focus component may be the current focus component. The length of time that tones a, b are played can be defined in user settings or by a default setting. The length of time that tones a, b are played can be the same or different. For instance, tones a, b can each be played for t/2 time units. Alternatively, tone a can be played for a longer time than tone b or tone b can be played for a longer time than tone a.

FIG. 3C illustrates a second aspect of the configuration of the continuous audible tone. In this aspect, the continuous audible tone is composed of tone a 318, tone b 322 and a set of intermediate tones 320. The continuous audible tone is played within a fixed amount of time t 324. Each tone can be played for a fixed amount of time t/n, where n is the number of tones in the continuous audible tone. The set of intermediate tones 320 can include the number of tones between tone a and tone b that can be played within the fixed time interval t. This can be represented mathematically as: (frequency of tone a-frequency of tone b)/time interval t. For example, in the case where tone a has a frequency of 1000 Hz and tone b has a frequency of 500 Hz and each tone is to be played for the same amount of time within a fixed time interval of ½ second (500 ms), each tone would be played for 1 ms and each tone would increase by 1 Hz (i.e., 1000 Hz-500 Hz/500 ms=1 Hz/ms) from tone a until tone b is reached. In this aspect, if the movement between two focus components is within a close proximity, then the tones in the continuous audible tone would sound close. If the movement between two focus components is far apart, then the tones in the continuous audible tone would sound far away. This audible transition is beneficial for a user to detect audibly the direction and distance of the movement between the two focus components.

Figure 3D:
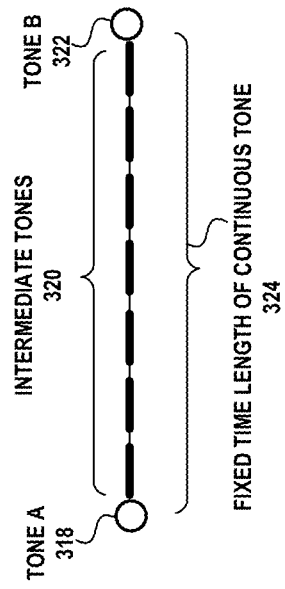

FIG. 3D illustrates a third aspect of the configuration of a continuous audible tone. In this aspect, the continuous audible tone is composed of tone a 326, tone b 330 and a set of intermediate discrete tones 328. The length of the continuous audible tone is not fixed rather varies 332 so that every semi-tone from tone a to tone b is played. A semi-tone is a half-step immediately above or below a tone in the standard diatonic scale. In order for each semi-tone to be played, the length of time that the continuous audible tone is played varies since it is based on the number of semi-tones between tone a and tone b. The number of semi-tones varies since it is based on the distance between tone a and tone b. In this aspect, users familiar with the music scale will readily recognize the semi-tones and be able to discern the distance between the two focus components. Alternatively, a user can count the number of discrete tones and use the number of discrete tones to discern the distance between the two focus components.

Figure 4:
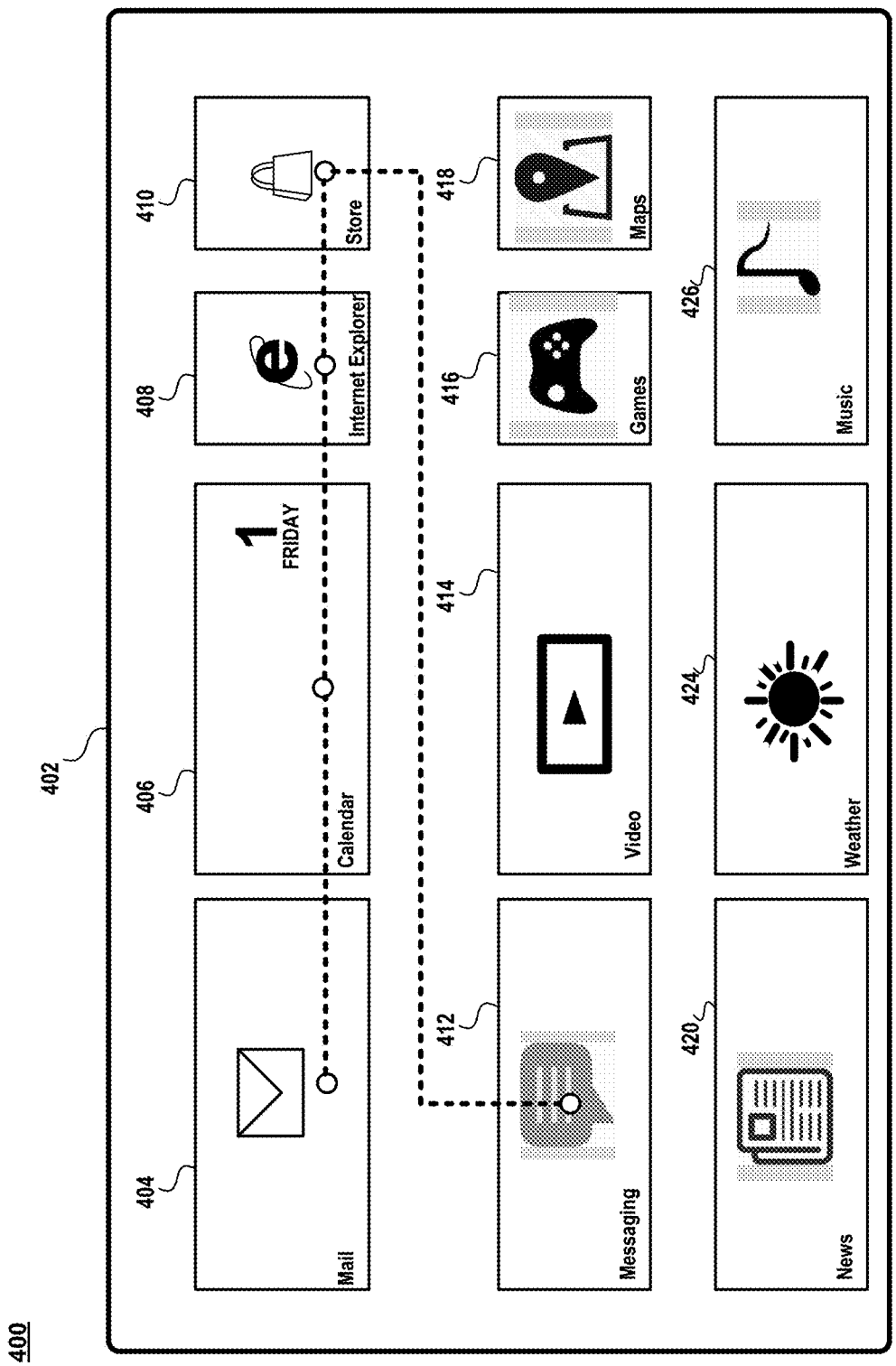
FIG. 4 is a diagram illustrating an exemplary graphical user interface showing a visual display of the transition between focus movements.

Attention now turns to a discussion of the visual representation of the focus movements. FIG. 4 illustrates an exemplary display 400 presenting a GUI 402 having components 404-426. The GUI 402 shows a path of the focus movements from component 404 to component 406 to component 408 to component 410 to component 412. In one aspect, this visual display of the focus movements can be shown in GUI 402 while the continuous audible tones are played. In another aspect, the visual display of the focus movements can be shown without the continuous audible tones. The visual display is beneficial for a developer of the GUI to study the focus movements of a user. In some instances, the developer of a GUI may wish to have the most frequently focus component situated in a particular area of the GUI so that the focus movements can be activated through tab navigation or other navigational mechanism such as screen reader commands. In other instances, the developer may re-configure the components in the GUI to achieve a desired result.

Attention now turns to a description of the operations for an aspect of the subject matter described with reference to exemplary methods. It may be appreciated that the representative methods do not necessarily have to be executed in the order presented, or in any particular order, unless otherwise indicated. The exemplary methods may be representative of some or all of the operations executed by one or more aspects described herein and that the method can include more or less operations than that which is described. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints.

Figure 5:
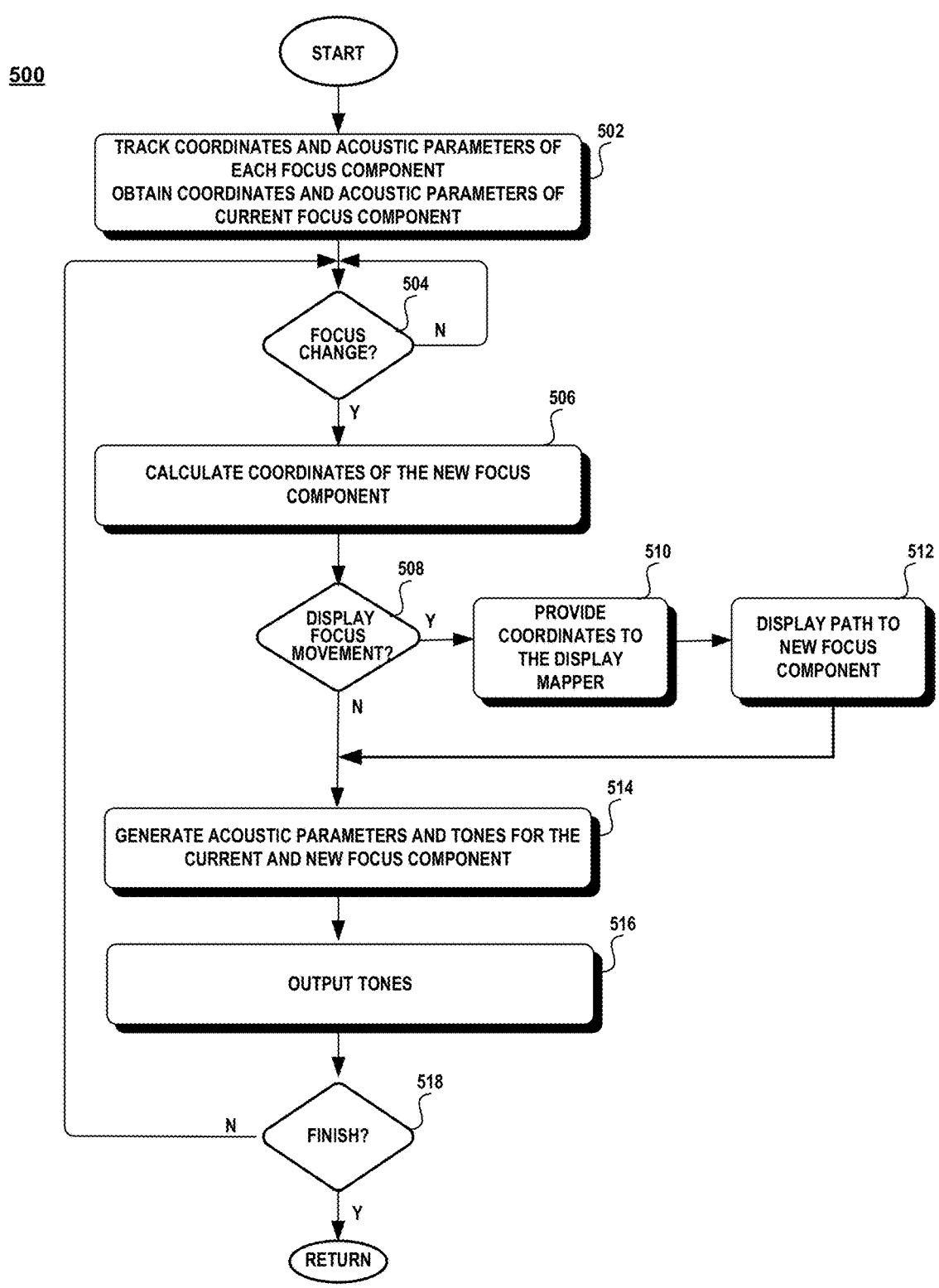
FIG. 5 is a flow diagram illustrating a method for the visual and audio representation of the focus movements.

FIG. 5 illustrates a flow chart showing an exemplary method 500. Referring to FIGS. 1 and 5, the focus change manager 116 obtains the spatial position and acoustic parameters of the current focus component (block 502). The focus change manager 116 tracks the focus movement of the GUI and stores the spatial positions and acoustic parameters of each focus component (block 502). The spatial positions can be represented as $P_X$ and $P_Y$ and the acoustic parameters include a frequency parameter, a left channel amplitude, and a right channel amplitude. These acoustic parameters represent tone a.

The focus change manager 116 waits (block 504-N) for a notification from the GUI that the focus has changed (block 504-Y). The GUI may receive notifications from an event manager (not shown) that is configured to detect user input from any of the user devices. The GUI responds to the user's input and tracks the user's selection of a different component in the GUI. When the focus change manager 116 is notified of a change in focus, the focus change manager 116 obtains the coordinates of the new focus component (block 506). The focus change manager 116 may utilize operating system application programming interfaces (APIs) to obtain the coordinates of the new focus component. These APIs may provide the upper left hand corner position of the focus component and size attributes from which the focus change manager 116 can determine the X, Y coordinates of the center position of the focus component.

If the system is visually displaying the focus transitions (block 508-Y), then the focus display manager 116 forwards the X, Y coordinates of the new focus component to the display mapper 106 (block 510). The display mapper 106 notifies the GUI 102 to draw a visual indicator from the current focus component to the new focus component and provides the GUI 102 with the X, Y coordinates of the positions of both focus components (block 512). In one aspect, the visual indicator can be a line that connects the midpoint of the position of the current focus component to the new focus component. However, it should be noted that the subject matter disclosed herein is not limited to a particular visual indicator and that other techniques may be used to display the path from one focus component to another.

Next, the focus change manager 116 provides the Y coordinate of the new focus component, $P_Y$, to the frequency mapper 118 and the X coordinate of the new focus component, $P_X$, to the pan mapper 120 (block 514). The frequency mapper 118 generates an acoustic parameter representing the frequency associated with the Y coordinate of the new focus component and the pan mapper 120 generates an acoustic parameter representing the X coordinate or the amplitude or gain associated with the new focus component.

In a scenario where the display is divided into 50 Hz segments, the frequency acoustic parameter can be calculated as 50 Hz*9 (1+int ($P_Y$*8)). This acoustic parameter may be output to the transition manager 122. The pan mapper 120 generates the right and left channel amplitudes based on $P_X$. When $P_X$ is greater than the midpoint of the display area, then $P_X$ represents the right channel amplitude and 1− $P_X$ represents the left channel amplitude. When $P_X$ is less than the midpoint of the display area, then $P_X$ represents the left channel amplitude and 1− $P_X$ represents the right channel amplitude.

The acoustic parameters for the current focus component and the new focus components are then sent to the transition manager 122. The transition manager 122 generates tones representing the current focus component, tone a, the new focus component, tone b, and intermediate tones if desired (block 514). These acoustic parameters are also saved (block 514). Finally, tones a, b, and/or the intermediate tones are sent to the sound generation manager 124 which outputs the continuous audible tone to a multi-channel sound device (block 516). This process is repeated (block 518-N) until the system terminates (block 518-Y).

Technical Effect

Aspects of the subject matter disclosed herein pertain to the technical problem of providing a user of a GUI with visual and audible feedback about the movement between focus components in the GUI in a more relevant and meaningful manner. The technical features associated with addressing this problem involve an audio mapper and a display mapper. The audio mapper generates a continuous audible tone to represent focus transitions from one focus component to another focus component. The continuous audible tone changes in frequency and pitch from one focus component to another focus component and in duration thereby enabling a blind user to recognize how far apart the focus components are from each other from the duration of the continuous audible tone and the direction of the movement from the difference in the pitch (i.e., frequency) and pan (i.e., amplitude) of the continuous audible tone. In this manner, a visually-impaired user can mentally visualize the layout of the components on the graphical user interface in order to find and manipulate the components in a similar manner as a sighted user.

A display mapper generates a visual display of the transition between focus components which can be displayed simultaneously with the continuous audible tone. This is beneficial to a developer of the GUI to study the user's interaction with the GUI in order to configure the GUI in a more user friendly manner Accordingly, aspects of the disclosure exhibit technical effects with respect to a more efficient mechanism for enabling a user to utilize a GUI with less user expenditure and frustration.

Additional Embodiments

It should be noted that the description of the subject matter disclosed herein has been with respect to a GUI resident in a display area on a display. However, the techniques described herein can be readily applied to a window otherwise known as an application window. A window is a two-dimensional object that is presented on a display that is surrounded by a frame. The window is under the control of an operating system and includes user interface (UI) controls that allow the user to interact with the operating system. The window can be configured into frequency and amplitude bands similar to the configuration described with respect to the GUI with the audio mapper may generate acoustic parameters in a similar manner as described above but with respect to the window. The display mapper would operate in a similar manner as described above but with respect to the window.

The subject matter described herein may be applied to other applications such as without limitation a spreadsheet application, a word processing application, a text editor application, and a web browser application. For example, a spreadsheet application contains elements in groups of cells and the GUI of the spreadsheet application provides to the navigation from cell to cell. The GUI in the spreadsheet application can produce a continuous audible tone as the user's focus transitions from one cell to another cell. In a word processing application, elements are placed in specific columns and rows that vary in size, shape, format (e.g., image, video, characters). A GUI for the word processing application may produce a continuous audible tone as the user's focus transitions from one column and/or row to another column and/or row. A web browser application displays a web page having various elements such as hyperlink, advertisements, images, and so forth. The web browser displays web pages similar to a GUI and can produce a continuous audible tone as the user's focus moves from one element in the browser to another element.

In another aspect of the subject matter disclosed herein, the display may include multiple windows. Each window may include a GUI having multiple components. A user may transition the focus from a component of a GUI in one window to the focus of a component of a GUI in a second window. The techniques described herein can be easily adapted to represent the transitions between the focus components between windows by associating each component in a GUI with a Z coordinate that represents a particular window.

The various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Exemplary Operating Environment

Figure 6:
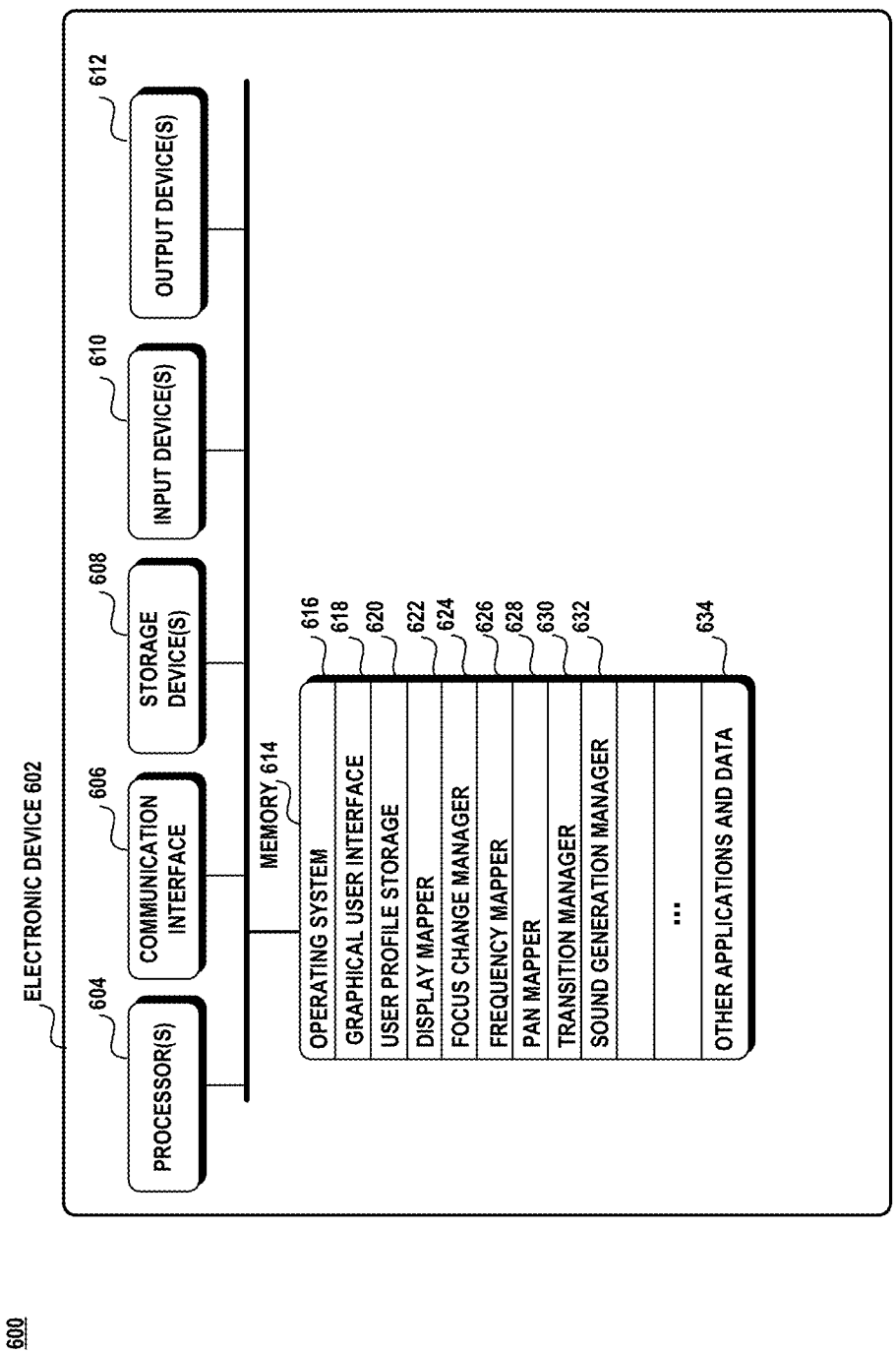
FIG. 6 is a block diagram illustrating an exemplary computing or operating environment.

Attention now turns to a discussion of an exemplary operating environment shown in FIG. 6. It should be noted that the operating environment 600 is exemplary and is not intended to suggest any limitation as to the functionality of the embodiments. The embodiments may be applied to an operating environment 600 utilizing at least one electronic device 602. The electronic device 602 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 600 may be configured in a network environment, a distributed environment, a multi-processor environment, or a stand-alone computing device having access to remote or local storage devices.

The electronic device 602 may include one or more processors 604, a communication interface 606, a storage device 608, one or more input devices 610, one or more output devices 612, and a memory 614. A processor 604 may be any commercially available processor and may include dual microprocessors and multi-processor architectures. The communication interface 606 facilitates wired or wireless communications between the computing device 602 and other devices. The storage device 608 may be computer-readable medium that does not contain propagating signals, such as modulated data signals transmitted through a carrier wave. Examples of the storage device 608 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 608 in the electronic device 602. The input devices 610 may include a keyboard, mouse, pen, voice input device, touch input device, etc., and any combination thereof. The output devices 612 may include a display, speakers, printers, sound device, etc., and any combination thereof.

The memory 614 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 514 may also include one or more external storage devices or remotely located storage devices that do not pertain to propagated signals, such as modulated data signals transmitted through a carrier wave.

The memory 614 may contain instructions, components, and data. A component is a software program that performs a specific function and is otherwise known as a module, program, application, and the like. The memory 614 may include an operating system 616, a graphical user interface 618, user profile storage 620, a display mapper 622, a focus change manager 624, a frequency mapper 626, a pan mapper 628, a transition manager 630, a sound generation manager 632, and other applications and data 634.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

In accordance with aspects of the subject matter described herein, a computer system can include one or more processors, a memory connected to one or more processors, a display and a sound device. The computer system includes a graphical user interface (GUI), an audio mapper, and a display mapper. The GUI is displayed on a display and comprises user-selectable components that when selected are deemed to be a focus components. The audio mapper generates a continuous audible tone that represents a transition from a first focus component to a second focus component. The continuous audible tone includes a first tone and a second tone. The first tone audibly represents a position of the first focus component in the GUI and the second tone audibly represents a position of the second focus component in the GUI, the first tone is based on first acoustic parameters including a frequency and an amplitude associated with the position of the first focus component in the GUI, wherein the second tone is based on second acoustic parameters including a frequency and amplitude associated with the position of the second focus component in the GUI. The sound device plays the continuous audible tone.

A tone in the continuous audible tone represents a note in a specific music scale where the tone is associated with at least one acoustic parameter associated with a position in the GUI. The continuous audible tone may include a set of intermediate tones from the first tone to the second tone within a specific music scale. The continuous audible tone may be played within a fixed amount of time. The continuous audible tone may include a set of intermediate tones that include all the semi-tones within a specific music scale from the first tone to the second tone. The continuous audible tone may be played for a variable time length in order to capture each of the semi-tones. The display mapper generates a visual representation of the transition from a first focus component to a second focus component.

A device can include at least one processor and a memory connected to the at least one processor. The at least one processor is configured to obtain one or more acoustic parameters of a current focus component where the current focus component is displayed in a display, the one or more acoustic parameters of the current focus component represents an audible position of the current focus component in the display. The at least one processor is configured to determine that a new focus component has been selected and calculate one or more acoustic parameters of the new focus component. The one or more acoustic parameters of the new focus component represent an audible position of the new focus component in the display. The at least one processor is configured to generate a continuous audible tone that includes a tone representing the current focus component, a tone representing the new focus component, and a set of intermediate tones. The set of intermediate tones represent a transition between the current focus component and the new focus component. A tone represents a note in a music scale having at least one of the acoustic parameters. The at least one processor is configured to output the continuous audible tone to a sound device.

The set of intermediate tones includes each semi-tone from the tone representing the current focus component and the new focus component. The set of intermediate tones includes each tone from the tone representing the current focus component and the new focus component, where the continuous audible tone is played for a fixed time length. The at least one processor displays a visual representation of a path between the current focus component and the new focus component. The path is displayed concurrently with the output of the continuous audible tone.

A method of using a system and device, such as the system and device described above, can include operations such as displaying a graphical user interface that has a plurality of components presented on a display. The display is configured into an X, Y coordinate plane, where the X-axis represents amplitudes of a left and right channel of a sound device and where an Y-axis represents frequencies of a note in a music scale. The method includes the operation of detecting activation made to focus a component and tracks the transition from a first focus component to a second focus component. A first focus component is associated with a position in the display that is based on a first set of X, Y coordinates and the second focus component is associated with a position in the display that is based on a second set of X, Y coordinates. The method includes the operation of converting the first set of X, Y coordinates into audible parameters representing a first tone and the second set of X, Y coordinates into audible parameters representing a second tone. The method includes an operation of generating a set of intermediate tones that are based on the distance between the first set of X, Y coordinates to the second set of X, Y coordinates and outputting a continuous audible tone that includes the first tone, the second tone, and the set of intermediate tones.

The intermediate tones may include each semi-tone in the music scale from the first tone to the second tone. The continuous audible tone is played for a variable length of time that is based on the number of semi-tones from the first tone to the second tone. The intermediate tones include each tone in the music scale from the first tone to the second tone and can be played for a length of time n/t, where n is the number of tones in the continuous audible tone, and t is a fixed amount of time that the continuous audible tone is played.

The method includes an operation of outputting a visual representation of the transition from the first focus component to the second focus component which may be displayed concurrently with outputting the continuous audible tone.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A system, comprising:
at least one processor and a memory;
a graphical user interface (GUI) displayed on a display, the GUI comprising user-selectable components that when selected are deemed to be a focus component;
an audio mapper that generates a continuous audible tone representing a transition from a first focus component to a second focus component, the continuous audible tone including a first tone, a second tone, and one or more intermediate tones, the first tone represents a first note of a music scale, the second tone represents a different note in the music scale, the one or more intermediate tones represent one or more notes in the music scale between the first tone and the second tone, the one or more intermediate tones played without selection of an associated user- selected component, the first tone audibly representing a position of the first focus component in the GUI, the second tone audibly representing a position of the second focus component;
a display mapper that displays a visual representation of a path of the transition from the first focus component to the second focus component in each non-selected component in the path; and
a sound device that plays the continuous audible tone.
2. The system of claim 1, wherein the one or more intermediate tones including one or more tones and/or semi-tones between the first tone and the second tone of the music scale.
3. The system of claim 1, wherein the continuous audible tone is configured to be played for a fixed amount of time.
4. The system of claim 1, wherein the one or more intermediate tones include all semi-tones within the music scale from the first tone to the second tone.
5. The system of claim 4, wherein the continuous audible tone is configured to be played for a variable time length in order to capture each of the semi-tones.
6. A method, comprising:
displaying a graphical user interface having a plurality of components presented on a display, the display configured into an X, Y coordinate plane, wherein an X-axis represents amplitudes of a left and right channel of a sound device and a Y-axis represents frequencies of a note in a music scale;
detecting activation made to focus a component;

tracking a transition from a first focus component to a second focus component, wherein the first focus component is associated with a position in the display that is based on a first set of X,Y coordinates and the second focus component is associated with a position in the display that is based on a second set of X,Y coordinates;

converting the first set of X,Y coordinates into audible parameters representing a first tone and the second set of X,Y coordinates into audible parameters representing a second tone, wherein the first tone represents a first note in a music scale, the second tone represents a second note in the music scale;

generating one or more intermediate tones, the one or more intermediate tones including notes in the music scale between the first tone and the second tone;

audibly outputting a continuous audible tone that plays the first tone, the second tone, and the one or more intermediate tones, wherein the one or more intermediate tones are played without selection of an associated user-selected component; and outputting a visual representation of the transition from the first focus component to the second focus component, wherein the visual representation includes each non-user selected component in the transition.

7. The method of claim 6, wherein the one or more intermediate tones includes each semi-tone in the music scale from the first tone to the second tone.

8. The method of claim 7, wherein the continuous audible tone is played for a variable length of time that is based on the number of semi-tones from the first tone to the second tone.

9. The method of claim 6, wherein the one or more intermediate tones includes each tone in the music scale from the first tone to the second tone.

10. The method of claim 9, wherein each tone is played for a length of time n÷t, where n is number of tones in the continuous audible tone, and t is a fixed amount of time that the continuous audible tone is played.

11. The method of claim 6, wherein length of the first tone, length of the second tone, and length of the one or more intermediate tones varies.

12. The method of claim 11, wherein the visual representation is displayed concurrently with outputting the continuous audible tone.

13. A device, comprising:

at least one processor and a memory;

wherein the at least one processor is configured to:

obtain one or more acoustic parameters of a current focus component, the current focus component displayed in a display, the one or more acoustic parameters of the current focus component representing an audible position of the current focus component in the display;

determine that a new focus component has been selected;

calculate one or more acoustic parameters of the new focus component, the one or more acoustic parameters of the new focus component representing an audible position of the new focus component in the display;

generate a continuous audible tone including a first tone representing the current focus component, a second tone representing the new focus component, and one or more intermediate tones, the first tone representing a first note in a music scale, the second tone representing a second note in the music scale, the one or more intermediate tones representing notes in the music scale between the first tone and the second tone;

output the continuous audible tone to a sound device and display a visual representation of a path from the current focus component to the new focus component, wherein the visual representation includes each non-selected component in the path.

14. The device of claim 13, wherein the one or more intermediate tones includes each semi-tone from the first tone to the second tone in the music scale.

15. The device of claim 13, wherein the continuous audible tone is played for a fixed time length.

16. The device of claim 13, wherein length of the first tone, length of the second tone, and length of the one or more intermediate tones vary.

17. The device of claim 16, wherein the path is displayed concurrently with the output of the continuous audible tone.

* * * * *